United States Patent [19]

Tse et al.

[11] 4,162,171
[45] Jul. 24, 1979

[54] VARNISH COMPOSITION

[76] Inventors: To S. Tse; Pui Y. Tse, both of 1244 Innes Ave., Los Angeles, Calif. 90026

[21] Appl. No.: 862,153

[22] Filed: Dec. 19, 1977

[51] Int. Cl.² ............................................. C08L 93/00
[52] U.S. Cl. ...................................... 106/226; 106/228
[58] Field of Search ............... 106/219, 226, 251, 290, 106/253

[56] References Cited

U.S. PATENT DOCUMENTS

| 149,004 | 3/1874 | Towne | 106/239 |
| 1,308,884 | 7/1919 | Wright | 106/251 |
| 1,367,888 | 2/1921 | Murphy | 106/226 |
| 2,263,603 | 11/1941 | Ziehl | 106/290 |

OTHER PUBLICATIONS

Chem. Abst. 40:6267.

Primary Examiner—Theodore Morris
Attorney, Agent, or Firm—Max Geldin

[57] ABSTRACT

A varnish composition comprising the components tung oil, pine tar, turpentine oil, tin and lead oxide, preferably within certain ranges of proportions.

7 Claims, No Drawings

VARNISH COMPOSITION

BACKGROUND OF THE INVENTION

The present invention relates to varnishes employed as a protective coating on surfaces or objects and/or for enhancing the appearance of such surfaces. The invention is particularly concerned with a varnish which is relatively quick drying, and forms a durable and protective coating on the surfaces of objects formed of various materials, such as metal, wood, plastics and ceramics.

Varnishes which are presently commercially available often have certain undesirable characteristics. Thus, many varnishes often require a long or extended drying time. In many instances the coating formed does not have sufficient toughness and resistance to abrasion, and has insufficient heat and chemical resistance. Further, in certain instances the desirable glossy appearance of the coating fades and becomes dull after a period of time.

It is an object of the present invention to provide a varnish composition containing a combination of ingredients which permit rapid drying of the varnish after it is applied to the surface of an object. Another object is the provision of an improved varnish which provides a tough, abrasion resistant and chemical and heat resistant coating which endures over an extended period of time. Yet another object is the provision of a varnish composition which forms a coating having an attractive glossy appearance which is resistant to fading and which endures over a long period.

SUMMARY OF THE INVENTION

The above objects and advantages are achieved and an improved varnish composition provided according to the invention, which comprises a combination of certain components, preferably employed in certain proportions, as defined in greater detail hereinafter.

The varnish composition of the invention comprises tung oil, pine tar, turpentine oil, tin and lead oxide.

DETAILED DESCRIPTION OF THE INVENTION

The various components of the varnish composition of the invention appear to have certain functions and characteristics when combined to form the varnish.

Thus, the tung oil ingredient provides a tough protective coating or film on the surface of the object, which is abrasion resistant and also heat and chemically resistant, and also gives the coating a glossy and attractive appearance.

The pine tar ingredient or component, which is in highly viscous or semi-solid form, also functions in conjunction with the tung oil to provide the above-noted strong glossy protective coating or film on the surface of the object.

The turpentine oil, or spirits of turpentine, functions as a thinner or diluent for the varnish composition.

The tin functions as an aid in causing the varnish to dry rapidly.

The lead oxide also functions to increase the rate of drying of the varnish and to form a tough coating or film.

The tin can be employed in the form of strips or powder. The lead oxide is preferably in the form of red lead oxide ($Pb_3O_4$).

The components of the composition are non-toxic and do not provide any hazard in manufacturing or employing the varnish.

In preferred practice, the above components of the varnish composition of the invention are employed in certain ranges of proportions, as noted in Table I below.

TABLE I

| Components | Percent by weight |
| --- | --- |
| Tung oil | 35–50 |
| Pine tar | 1–5 |
| Turpentine oil | 35–50 |
| Tin | 5–13 |
| Lead oxide | 0.5–5 |

The oil-base composition of the invention can be produced by mixing the various above noted components together and heating the resulting mixture at elevated temperature, preferably to boiling, to form a uniform mixture. The above noted mixture is then permitted to cool and the resulting mixture or varnish in liquid form can be applied to varnish any surface by procedures well known in the art. Thus, the varnish composition can be applied by brush, roller or by spraying using suitable spraying equipment.

The varnish composition of the present invention possesses a variety of advantages. Thus, the varnish composition hereof is capable of drying in a very short time of the order, for example, of about ½ hour after it is applied to a surface, whereas many of the varnishes now commercially available require substantially longer drying periods, for example as much as about 8 to 48 hours.

The varnish composition also spreads readily when applied to the surface of an object. Thus, the spreading rate of the varnish composition hereof has been found to be substantially higher, e.g. twice as high, as many varnishes now available, and covers a substantially larger area per unit weight as compared to many commercially available varnishes.

Shortly after the composition is applied to the surface and commences to dry, the resulting coating or film commences to become hard and tough almost immediately. After completely drying the resulting film resists abrasion and scratching, and is heat and chemcially resistant, and repels water. It also is substantially unaffected by the environmental elements, including rain and sun.

The gloss acquired by the hardened coating formed by the invention varnish is resistant to fading over a long period of time. Any dirt or dust which settles on the coated surface can be cleaned, for example, with soap and water to restore the surface gloss. Also, the gloss remains substantially unimpaired by moderate heat and hot water.

The varnish composition of the invention can be applied to a variety of surfaces, including metal, wood, plastics, ceramics, and the like. Thus, the invention varnish can be used to provide a protective coating having the advantages noted above, on the surface of metals such as copperware, ironware, automobiles, airplanes, trains, ships and boats, e.g. to prevent surface corrosion and provide an attractive or beautifying appearance. The varnish composition can also be applied to wood objects, including bamboo objects and furniture, to prevent decay. The varnish can also be applied to surfaces of objects formed of leather, to book covers, hardwood floors, and porcelain, to prevent cracking. The varnish hereof can also be applied generally to the interior and exterior of homes and buildings including the roofs thereof, to resist weathering.

The following is an example of practice of the invention.

EXAMPLE I

60 Grams of tung oil, 5 grams of pine tar, 60 grams of turpentine oil, 10 grams of tin, and 5 grams of lead oxide (red lead oxide), were mixed together. The components of the composition were present in the approximate proportions by weight set forth in Table II below.

TABLE II

| Components | Percent by weight |
|---|---|
| Tung oil | 44 |
| Pine tar | 3 |
| Turpentine oil | 44 |
| Tin | 7 |
| Lead oxide | 2 |
| | 100 |

The resulting mixture or varnish composition was heated essentially to boiling until it was uniformly mixed, and then was permitted to cool. The varnish composition then was applied by brushing to a wood surface. The liquid varnish composition spread readily over the surface, and dried in a period of about ½ hour at ambient temperature to form a tough, hard and abrasion resistant surface having a high gloss.

The coating or film formed on the surface of an object employing the varnish of the invention is essentially colorless. If desired, however, coloring agents such as pigments can be added to the varnish composition to impart a desired color thereto. These include for example, yellow, blue, green, white, black, red, orange, silver and gold pigments, or combinations thereof. Thus for example, a suitable pigment which can be employed is the pigment marketed as Majestic Orange Imperial Pigment, by Hercules, Inc. The coloring agent can be present in an amount ranging from about 1 to about 25% by weight of the overall composition. However, it will be understood that the presence of a coloring agent is optional.

The following are additional examples of varnish compositions according to the invention:

EXAMPLE II

TABLE III

| Components | Percent by weight |
|---|---|
| Tung oil | 40 |
| Pine tar | 4 |

TABLE III-continued

| Components | Percent by weight |
|---|---|
| Turpentine oil | 45 |
| Tin | 8 |
| Lead oxide | 3 |
| | 100 |

EXAMPLE III

The varnish composition of Example I containing 5% of Majestic Orange Imperial Pigment, by weight of the overall composition.

From the foregoing, it is seen that the invention provides an improved varnish composition formed of commercially available components, which can be readily applied to a variety of surfaces, and which spreads readily and dries rapidly to produce a tough, hard, abrasion and chemically resistant film of attractive glossy appearance, and which retains these characteristics over extended periods of time.

While particular embodiments of the invention have been described for the purpose of illustration within the spirit of the invention, it will be understood that the invention is not to be taken as limited except by the scope of the appended claims.

What is claimed is:

1. A varnish composition which comprises tung oil, pine tar, turpentine oil, tin and lead oxide, the components of said composition being present in an amount ranging from about 35 to about 50% tung oil, about 1 to about 5% pine tar, about 35 to about 50% turpentine oil, about 5 to about 13% tin, and about 0.5 to about 5% lead oxide, by weight.

2. The varnish composition as defined in claim 1, the components of said composition being present in the amounts of about 44% tung oil, about 3% pine tar, about 44% turpentine oil, about 7% tin and about 2% lead oxide, by weight.

3. The varnish composition as defined in claim 1, said lead oxide being red lead oxide.

4. The varnish composition as defined in claim 1, including a coloring agent.

5. The varnish composition as defined in claim 1, including a coloring agent in the form of a pigment present in an amount ranging from about 1 to about 25% by weight of the overall composition.

6. An object containing on a surface thereof a tough glossy coating formed by applying to said surface a varnish composition as defined in claim 1, and drying the resulting coating.

7. An object containing on a surface thereof a tough glossy coating formed by applying to said surface a varnish composition as defined in claim 2, and drying the resulting coating.

* * * * *